United States Patent [19]
Towns et al.

[11] Patent Number: 6,153,711
[45] Date of Patent: Nov. 28, 2000

[54] RHEOLOGY MODIFICATION OF PRECURSOR SOLUTIONS

[75] Inventors: Carl Towns, Stanstead Essex; Ilaria Grizzi, London, both of United Kingdom

[73] Assignee: Cambridge Display Technology Ltd., United Kingdom

[21] Appl. No.: 09/355,383

[22] PCT Filed: Jan. 26, 1998

[86] PCT No.: PCT/GB98/00214

§ 371 Date: Jul. 27, 1999

§ 102(e) Date: Jul. 27, 1999

[87] PCT Pub. No.: WO98/32783

PCT Pub. Date: Jul. 30, 1998

[30] Foreign Application Priority Data

Jan. 28, 1997 [GB] United Kingdom .................. 9701680

[51] Int. Cl.[7] .................................................. C08F 2/00
[52] U.S. Cl. ........................... 526/88; 528/488; 528/502; 528/503; 526/59; 526/60; 526/75; 526/346; 427/207.1; 347/6
[58] Field of Search .................................... 528/488, 502, 528/503; 526/59, 60, 75, 88, 346; 427/207.1; 347/6

[56] References Cited

U.S. PATENT DOCUMENTS

| | | | |
|---|---|---|---|
| 3,532,643 | 10/1970 | Wessling et al. | 260/2 |
| 3,706,677 | 12/1972 | Wessling et al. | 260/2 |
| 5,064,572 | 11/1991 | Ohnishi et al. | 252/500 |
| 5,994,496 | 11/1999 | Van Haare et al. | 528/376 |

FOREIGN PATENT DOCUMENTS

| | | |
|---|---|---|
| 0 603 939 A2 | 6/1994 | European Pat. Off. . |
| 0 644 217 A1 | 3/1995 | European Pat. Off. . |
| 0 707 022 A2 | 4/1996 | European Pat. Off. . |
| 2 303 633 | 2/1997 | United Kingdom . |
| 2 322 136 | 8/1998 | United Kingdom . |
| WO90/13148 | 11/1990 | WIPO . |
| WO93/14177 | 7/1993 | WIPO . |

OTHER PUBLICATIONS

Hsieh, B.R., "Chlorine Precursor Route (CPR) Chemistry To Poly (P–Phenylene Vinylene)–Based Light Emitting Diodes," Advanced Materials, vol. 7, No. 1, Jan. 1, 1995, pp. 36–38, XP000486181.

Alok Kumar et al., "Synthesis Of Poly(1,4–Phenylenevinylene) By Metathesis Of P–Divinylbenzene", Makromolekulare Chemie, Rapid Communications, vol. 13, No. 6, Jun. 1, 1992, pp. 311–314, XP000282076.

*Primary Examiner*—Samuel A. Acquah
*Attorney, Agent, or Firm*—Wolf, Greenfield & Sacks, P.C.

[57] ABSTRACT

A method for tailoring the viscosity of a conjugated polymer precursor, the method comprising synthesizing the precursor by a polymerization reaction and, during the polymerization reaction, applying a shear to the reactants of the polymerization reaction so as to define the viscosity of the precursor at a desired value.

20 Claims, 2 Drawing Sheets

RHEOLOGY MODIFICATION OF PRECURSOR SOLUTIONS

This invention relates to the modification of the rheology of precursor solutions, and especially to modifying the viscosity of precursor poly(p-phenylene vinylene) "PPV" solutions, and their subsequent use in the manufacture of electroluminescent devices.

Organic electroluminescent devices include an organic light emissive layer and are made so that they emit light when a suitable voltage is applied across electrodes deposited on either side of the organic emissive layer. One class of such organic materials is semiconductive conjugated polymers, which are described in our earlier patent U.S. Pat. No. 5,247,190, the entire contents of which are incorporated herein by reference. PPV is one such material, and will emit light when positive and negative charge carriers are passed through it by a voltage being applied between two suitable charge carrier injecting layers. The electroluminescent efficiency of these devices is known to depend on the balancing of the electrons and holes that are injected into the device and meet to form electron/hole pairs, as well as on the efficiency with which these electron/hole pairs combine to radiate light (i.e. the photoluminescence efficiency: see, for example, N. C. Graham and R. H. Friend, Solid State Physics, 49, 1, 1995). Therefore, to achieve an efficient device it is of critical importance to have sufficiently high photoluminescence efficiency.

There are several approaches used for the processing of conjugated polymers to form electroluminescent layers. One approach uses a precursor polymer which is soluble and can therefore be easily coated by standard solution-based processing techniques (e.g. spin-coating, blade-coating, reverse roll coating, meniscus coating, contact/transfer coating and ink-jet printing) and then converted in situ by suitable heat treatment to give the finally conjugated and insoluble polymer. Another approach uses directly soluble conjugated polymers which do not require a subsequent conversion stage.

The coating technique is usually chosen to suit the area that is to be coated. Depending on the application, one or other of these approaches might be preferred. The precursor polymer approach is useful when subsequent processing (for instance patterning with a top electrode or coating with further polymer layers such as transport layers or emitting layers of a different colour) might lead to damage of a directly soluble polymer film. Converted polymer films also tend to have better thermal stability, which is of importance both during fabrication and during storage and operation of devices at high temperatures. However, problems can arise during manufacture using the precursor approach, especially with a polyelectrolyte system, owing to the special rheology of these materials. For instance, even at relatively low concentrations precursor polyelectrolyte solutions can have high viscosities (for example 400 cps or more for a precursor solution with a solid content of only 0.4%) and can therefore be difficult to coat at the desired thicknesses, especially by low-viscosity methods such as inkjet printing. In general, there is a need to be able to tailor the viscosity of the precursor to suit the needs of subsequent processes—especially coating techniques.

According to the present invention from a first aspect there is provided a method for tailoring the viscosity of a conjugated polymer precursor, the method comprising synthesising the precursor by a polymerisation reaction and, during the polymerisation reaction, applying a shear to the reactants of the polymerisation reaction so as to define the viscosity of the precursor at a desired value.

The shear is suitably provided by relative movement of the reactants and a stirring apparatus located in the reactants. The shear is preferably provided by agitating and most preferably stirring the reactants. The reactants may include the conjugated polymer precursor itself. The shear is preferably applied so as to control and most preferably reduce the viscosity of the precursor.

In a typical reactor configuration the shear may be produced by rotating a stirrer relative to the reaction vessel at a rate of rotation in the range from 50 to 1000 rpm. The shear may be produced by the use of a homogeniser. The rate of rotation of the homogeniser's operation may be in the range from 8000 to 25,000 rpm, suitably between 10000 and 15000 rpm and preferably between 13,500 and 25,000 rpm.

The shear is preferably applied for the duration of the synthesis reaction. Alternatively the shear may be applied intermittently. The shear may begin after the start of synthesis and may stop before the end of synthesis. The shear preferably also serves to mix the reactants.

The first aspect of the present invention may also provide a method for reducing the viscosity of a conjugated polymer precursor, the method comprising applying a shear to the precursor reactants during its synthesis by a polymerisation reaction.

In addition to or instead of applying shear, the viscosity may be reduced by increasing the degree of conjugation of the precursor. This may be achieved by, for example, increasing the concentration or amount of any medium used to promote polymerisation (e.g. a base), increasing the reaction temperature or increasing the duration of the reaction.

In addition to or instead of applying shear or increasing the degree of conjugation of the precursor, the viscosity may be reduced by adding a salt to the precursor during or preferably after the synthesis reaction. The salt may be, for example, ammonium formate or ammonium acetate. The salt is suitably soluble and suitably one that can conveniently be removed from a converted polymer layer formed from the precursor—for example a salt that decomposes at a temperature between 200 and 350° C, e.g. ammonium chloride. The salt may have a lattice energy that is sufficiently high (e.g. lithium chloride) to prevent its breakdown if it is present in a light-emitting device in use—e.g. at voltages below 100 or 50 or 20 or 10 or 5 volts.

The method preferably comprises adding in the range from 0.0001 w/v % to 5 w/v % of the salt to the precursor, preferably 0.01 w/v % to 1.0 w/v %, most preferably in the range from 0.1 w/v % to 0.5 w/v %.

After the precursor has been synthesised it is preferably purified (e.g. by dialysis) to remove unreacted components etc. The step of adding the salt is preferably subsequent to the step of purifying the precursor. The salt is preferably added to the precursor after the purification step. The synthesised precursor is preferably dialysed (as described below) between the synthesis step and the step of adding the salt.

According to the present invention from a second aspect there is provided a conjugated polymer precursor having a viscosity of less than 200 cps.

In both the embodiments of the invention "desired viscosity" or the viscosity of the precursor is preferably below 200 cps or below 150 cps, more preferably below 100 cps, below 50 cps or below 20 cps, and most preferably below 15 cps or below 10 cps or below 5 cps. The viscosity is suitably above 1 cps or above 2 cps. Where the precursor is to be coated by an ink-jet process the viscosity of the precursor is suitably below 5 cps, preferably from 1 cps to 5 cps and most preferably in the range from around 3.5 cps to 4 cps. These viscosity figures suitably refer to the viscosity of the precursor after completion of the synthesis step, and most preferably after a subsequent purification/dialysis step. The dialysis step preferably results in the removal of relatively low molecular weight material, e.g. material (preferably substantially all material) below 10000 Daltons and preferably below 12000 Daltons.

In all the embodiments of the invention the solid content of the precursor after synthesis (and preferably after subsequent dialysis and concentration as described above) is suitably in the range from 0.4% to 2%.

In all the embodiments the conjugated polymer precursor is preferably a polyelectrolyte material. The precursor is preferably a precursor of a conductive or semiconductive polymer and/or an electroluminescent polymer. The precursor may be a PPV-like precursor (particularly a di-alkyl or di-alkoxy substituted PPV precursor) such as PPV itself or a PPV-derivative (e.g. a di-alkoxy derivative), a polyfluorene and/or a co-polymer incorporating polyfluorene segments, PPVs and/or related co-polymers. As an example, a precursor of PPV is poly (p-xylene-α-tetrahydrothiophene bromide). When neutralised with an acid a copolymer such as poly (p-xylylene-α-tetrahydrothiophene bromide)-co-(α-acetoloxy-p-xylylene) is formed. Other halides than bromides (e.g. chlorides) may be used.

The term "conjugated" indicates a polymer/precursor for which the main chain is either fully conjugated, having extended pi molecular orbitals along the length of the chain, or is partially or substantially conjugated, but with interruptions to conjugation at various positions, either random or regular, along the main chain. It includes within its scope homopolymers and copolymers.

A further aspect of the invention may be the addition of a salt (e.g. of the classes and at the times described above) so as to reduce the temperature required for a conjugated polymer precursor (especially a PPV precursor).

BRIEF DESCRIPTION OF DRAWINGS

The present invention will now be described by way of example with reference to the accompanying drawing, in which.

Three ways of modifying the rheology, and in particular reducing the viscosity, of polyelectrolyte precursor PPV solutions will be described: the use of shear during synthesis of the precursor, tailoring the degree of conjugation of the precursor, and adding a salt to the precursor.

Shear

To synthesise a precursor material for a light emitting polymer film a monomer material is generally subjected to a polymerisation reaction until the desired degree of polymerisation has been reached. For example, a base can be added to instigate polymerisation and when the synthesis reaction is complete, an acid added to halt the reaction. The applicants have found that the shear regime applied to the reactants whilst the synthesis reaction is under way can influence the rheology of the final precursor material.

Figure 1:
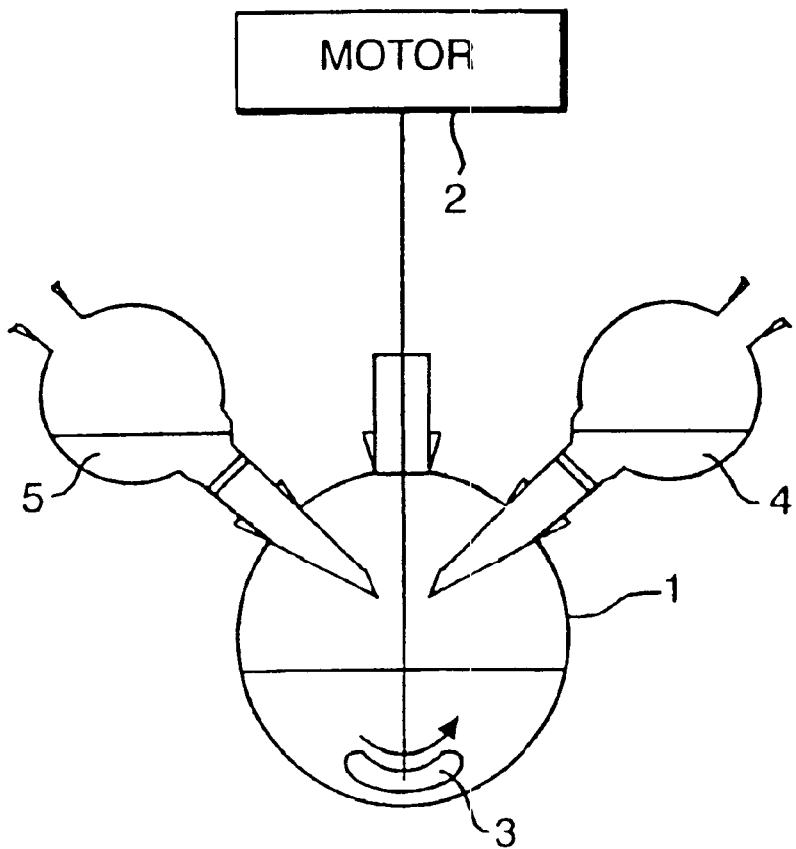
FIG. 1 shows a reactor configuration for PPV synthesis.
Figure 3:
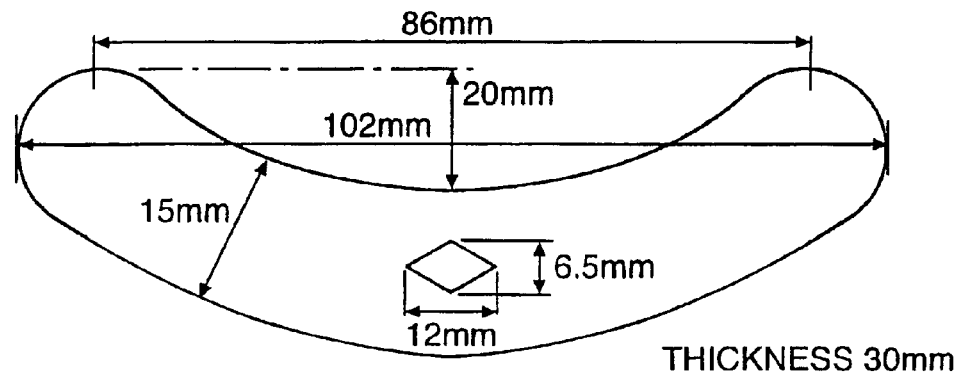
FIG. 3 shows a stirring paddle.

For example, FIG. 1 shows apparatus suitable for synthesising PPV precursor material. A 100 ml three-necked round bottomed flask 1 is equipped with a mechanical stirrer 2 and PTFE paddle 3 and two 100 ml pressure equalising dropping funnels 4,5 are fitted in the remaining necks. The paddle is shown in detail in FIG. 3. The base of the paddle is located close to the floor of the flask. With stirring (at, for example, approximately 150 rpm for this apparatus configuration) 12.5 g of p-xylenebis(tetrahydrothiophenium bromide) (28 mmoles) is dissolved in 240 ml MeOH:$H_2O$ (1:1) solvent in the flask 1. The solution is deoxygenated in situ for 20 minutes using a nitrogen purge via a disposable glass pipette.

A 40 ml solution of KOH (3.6 molar) in MeOH:$H_2O$ (1:1) is made up and deoxygenated for 20 minutes in the pressure equalising funnel 4 using a disposable glass pipette. Then, to begin the polymerisation reaction for synthesis of the PPV precursor, the base solution is added to the flask 1 over a period of 30 seconds while stirring. To provide shear and to mix the reactants the polymerisation reaction solution is stirred at approximately 70 rpm for a further 90 seconds. The total reaction time is around 2 minutes.

During the polymerisation 20 ml of glacial acetic acid is purged in funnel 5 with nitrogen via a disposable glass pipette. Then, after the polymerisation has run for 90 seconds, to lower the pH of the polymer solution and halt the polymerisation reaction the acetic acid is added quickly from funnel 5 and under continued nitrogen purge. The flask 1 is stirred for approximately 3 minutes. The pH is checked with a strip of universal indicator paper; the measured pH should be in the range from 3 to 5.

The polymer solution is then dialysed at a temperature no greater than 5° C. against 5 l of deoxygenated MeOH:$H_2O$ (1:1) 5 times, changing the dialysis solution every 24 hours. The dialysis is carried out in a 5 l conical flask sealed with Parafilm. At each change the conductivity of the dialate is monitored. The final dialate conductivity should be <1 S/cm. Finally, the polymer solution is dialysed once more against deoxygenated MeOH for 24 hours. The dialysis should remove substantially all components (salts, dimers, trimers, un-reacted monomer etc.) below 12000 Daltons.

The polyelectrolyte PPV precursor solution is then ready to use. It has a viscosity of around 400 to 600 cps (measured by the Brookfield method). When this solution is spin-coated (e.g. on to a 1 $cm^2$ substrate) it gives a reasonably uniform film thickness: approximately ±10% at a solid content of approximately 0.4% to 0.5%.

As another example, the same procedure could be followed but with the rate of stirring during the polymerisation reaction approximately 650 rpm. In this case the solution has a viscosity of approximately 35 cps at a concentration of 0.7 w/w %, and when spin-coated on to a 1 $cm^2$ substrate gives a very uniform film of 1000 Å thickness. Even at high concentrations this solution has a relatively low viscosity (e.g. 70 cps at 1.5 w/w % concentration).

The viscosity of the precursor solution can be altered over a wide range by a suitable choice of shear regime. At the lower limit, the minimum shear that can be applied ought to mix the reactant adequately. With the apparatus described above if the stirring rate chosen for the synthesis is significantly less than 50 rpm, then the viscosity is generally not sufficiently low to allow uniform films to be obtained using spin-coating and/or does not even mix the reactants adequately. For a solution with 0.4% solid content a stirring rate of 50 rpm yields a viscosity of around 700 cps. At higher levels of shear, for instance at stirring rates of up to 1000 rpm, viscosities in at least the range down to around 20 cps, 5 cps or even less can be obtained for solutions of 0.5% solid content, and at least down to around 3 to 5 cps (from above 1500 cps) for 1.5% solid content. To apply even higher levels of shear the synthesis reaction may be carried out in a cylindrical homogeniser (e.g. the IKA T25Basic UltraTurrax using the dispersing tool S25N18G for volumes of 10 to 500 ml). With the homogeniser running at rates of up to 25000 rpm viscosities of around 2 cps can be obtained for precursor solutions with solid contents of around 0.5% and in the range from 1 to 7 cps for precursor solutions with solid contents of around 1.5%. The shear may be up to at least 50,000 s$^{-1}$; suitable shears include especially those from 25,000 s$^{-1}$ upwards.

Thus, the viscosity of the precursor solution may be tailored to that required for a particular coating technique. For example, if the desired coating technique is spin coating then for a precursor solution with solid content of around 0.5% viscosities in the range from 100 to 700 cps, preferably between 100 and 400 cps and most preferably between 200 and 400 cps, are preferred to give a uniform film (of thickness, say, 1000±50 Å) of conjugated polymer after conversion. For coating PPV on larger areas (e.g. greater than 1 cm$^2$) it is difficult to get even films at viscosities at or above 400 cps. If the desired coating technique is ink-jet printing then for a precursor solution with a solid content of around 0.375 to 1.5% the preferred viscosity is below 5 cps, most preferably around 3.75±0.25 cps.

Blade coating can also be used preferably with precursors having viscosities of 200 cps or above and a solid content of approximately 0.4% to 0.5%.

The mechanism for the change in viscosity is not fully understood. It is believed that the shear regime may bring about a change in the secondary structure of the precursor material. There may also be a contribution from the change in molecular weight.

Degree of Conjugation

A second method of modifying the rheology of the precursor solution is by controlling the degree of conjugation. The degree of conjugation in the precursor material can be monitored with UV or visible spectroscopy or colourimetry and is determined by the amount of time the precursor polymer is exposed to a basic medium during polymerisation or dialysis (or other purification). Thus, by delaying the addition of the acid in the detailed example described above the degree of conjugation is increased. Alternatively, even with the reaction time kept constant if necessary, the base concentration or the temperature of reaction may be increased. As the degree of conjugation increases the viscosity falls. This is believed to result from the change in the polyelectrolyte nature of the precursor material, which occurs as the conjugation replaces charged ionic groups with double bonds.

To change the polyelectrolyte nature of the precursor a non-ionic substituent can be introduced in the polymer chain by quenching the polymerisation with a suitable nucleophile (e.g. acetic acid, as shown at line three in the table below). This also has the effect of decreasing the viscosity.

The following table shows some experimental results which demonstrate the effect of acid addition and concentration on viscosity.

| mol KOH/mol monomer | Acid | Stirring speed (rpm) | Base addition time(s) | Reaction Time(s) | Temp. (° C.) | Solid Content (w/w) | Viscosity (cps) | Film Thickness (Å) |
|---|---|---|---|---|---|---|---|---|
| 1 | HCl | 300 | 33 | 89 | 21.5 | 0.61% | 666 | 1060 |
| 5 | HCl | 300 | 31 | 90 | 20 | 0.67% | 400 | 1300 |
| 5 | Acetic | 300 | 30 | 90 | 21.5 | 0.64% | 300 | 1000 |
| 5 | Acetic | 300 | 30 | 15 | 21.5 | 0.38% | 910 | 1090 |
| 5 | HCl | 300 | 29 | 90 | 10 | 0.65% | 740 | 1000 |

The figures for film thickness indicate the film thickness after spin coating on to a silicon wafer at 700 rpm for 30 seconds followed by 1200 rpm for 90 seconds. All the films were of an acceptable quality, except the fourth (with viscosity 910 cps) which was of variable thickness.

Salt Addition

A third method of modifying the rheology of the precursor solution is by adding reagents, for example salts, that inhibit the polyelectrolyte effect in such systems. Suitable reagents include lithium chloride and ammonium chloride and organic salts such as ammonium formate and ammonium acetate. In each case the salt is preferably added to the precursor solution after the final dialysis step described above.

For example, for a PPV precursor solution with a solid content of around 1.85% and prepared under shear as described above to have a viscosity after dialysis of 110 cps, the viscosity can be reduced to 12 cps by the addition of 0.1% LiCl, or 10 cps by the addition of 0.3% NH$_4$Cl, or 15 cps by the addition of 0.5% NH$_4^+$HCO$_2^-$, or 11 cps by the addition of 0.6% NH$_4^+$CH$_3$CO$_2^-$. For a solid content of around 0.5% the viscosity can be reduced from 250 cps to around 5 cps by adding 0.1 wt % LiCl.

If the salt is non-organic it is preferably one that can be removed from the conjugated polymer film after the conversion step. For lithium chloride the salt can be washed from the conjugated polymer film after the conversion step. Lithium chloride has a high lattice energy and its ions are therefore unlikely to be separated if it is present in a PPV film used in a device—therefore, it need not be washed from the film. Ammonium chloride decomposes from the PPV film during the conversion step (at approximately 339° C.) and a further washing procedure is not required.

Figure 4:
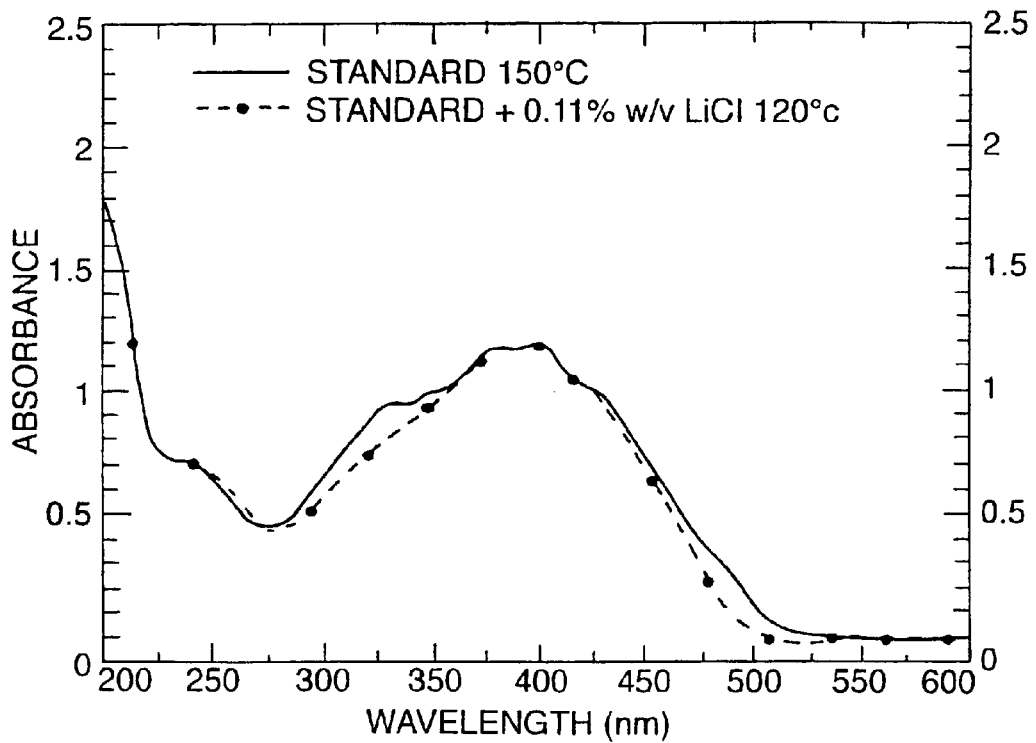
FIG. 4 shows the UV/visible spectra of two films, one from a standard BrPPV precursor converted at 150° C. under nitrogen flow and the other from the same precursor to which was added LiCl 0.11% w/v and which was converted at 120° C.

It has been found that the addition of salts as described above has red-shifted final PPV layers and caused their photoluminescence to fall. These issues could be addressed by reducing the temperature of the conversion step or carrying out the conversion step under a vacuum. Alternatively, the addition of a salt could be so as to allow the temperature of the conversion step to be reduced. For instance, FIG. 4 shows the absorbance spectra of two films: one a BrPPV precursor converted at 150° C. and the other a similar BrPPV precursor to which 0.11% w/v of LiCl was added prior to conversion at 120° C. The spectra are very similar.

Use

Figure 2:
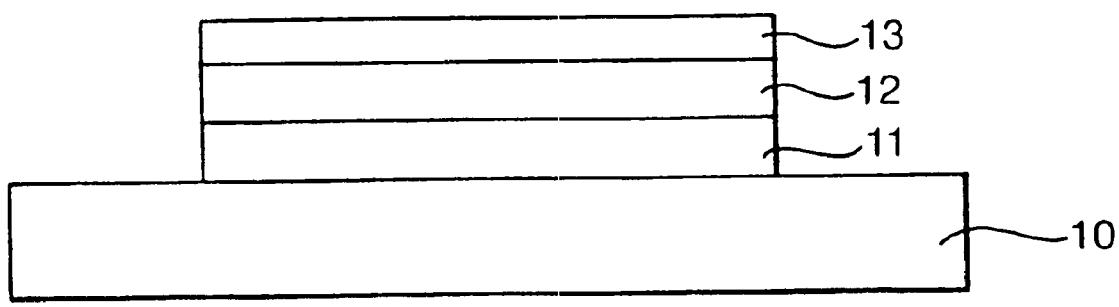
FIG. 2 shows an electroluminescent device.

After being synthesised as described above, a viscosity-modified precursor may be used to form a light emitting layer in an electroluminescent device. For instance, FIG. 2 shows an electroluminescent device of this type, in which there is a glass sheet substrate 10 which carries an anode layer 11 of indium-tin oxide (ITO) for injecting positive charge carriers, a layer 12 of PPV and a cathode 13 of a low work function metal or alloy, such as an alloy of aluminium and lithium. To form the PPV layer a viscosity-modified PPV precursor formed as described above is deposited by the desired coating technique (e.g. spin coating, blade coating or ink-jet printing) on to the substrate 10 which already bears the electrode layer 11. The precursor is then converted at 150° C. in nitrogen for four hours. Tetrahydrothiophene is removed during conversion and the counter ion to the thiophenium salt is bromide or chloride. The conversion process yields the completed layer of PPV and the electrode layer 13 is then deposited over it. There could, of course, be other layers in the device too—for example, to improve charge injection or transport properties.

Examples of subsequent processing steps after synthesis are as follows: blade coating (preferred viscosities are around 200 cps for a solid content of 0.5%), ink-jet printing (preferred viscosities are below 5 cps) and spin coating.

The present invention may include any feature or combination of features disclosed herein either implicitly or explicitly together or in isolation, or any generalisation thereof irrespective of whether it relates to the presently claimed invention. In view of the foregoing description it will be evident to a person skilled in the art that various modifications may be made within the scope of the invention.

What is claimed is:

1. A method for tailoring the viscosity of a conjugated polymer precursor, the method comprising synthesising the precursor by a polymerisation reaction and, during the polymerisation reaction, applying a shear to the reactants of the polymerisation reaction so as to define the viscosity of the precursor at a desired valued.

2. A method as claimed in claim 1, wherein the shear is imposed for substantially the whole duration of the synthesis reaction.

3. A method as claimed in claim 1, comprising a further step of removing low molecular weight components remaining after the synthesis.

4. A method as claimed in claim 1, wherein the viscosity of the resulting precursor is less than 200 cps.

5. A method as claimed in claim 4, wherein the viscosity of the resulting precursor is less than 100 cps.

6. A method as claimed in claim 1, wherein the precursor is a poly(p-phenylene vinylene) precursor.

7. A method as claimed in claim 1, wherein the conditions of the polymerisation reaction are selected so as to define the viscosity of the precursor at the desired value.

8. A method as claimed in claim 1, wherein the duration of the polymerisation reaction is between 60 and 120 seconds.

9. A method as claimed in claim 1, comprising the step of adding a salt to the synthesised precursor so as to define the viscosity of the precursor at the desired value.

10. A method as claimed in claim 9, wherein the salt is an organic salt.

11. A method as claimed in claim 9, wherein the salt is a soluble salt and/or a salt having a high lattice energy.

12. A method as claimed in claim 9, wherein the salt decomposes at a temperature below 350° C.

13. A method as claimed in claim 9, wherein the salt is an ammonium salt.

14. A method as claimed in claim 9, wherein the quantity of salt added is in the range from 0.01 w/v % to 1.0 w/v % of the precursor.

15. A method as claimed in claim 9, wherein the salt is added to the precursor after completion of the synthesis.

16. A conjugated polymer precursor having a viscosity of less than 200 cps.

17. A conjugated polymer precursor as claimed in claim 16, having a viscosity of less than 50 cps.

18. A poly(p-phenylene vinylene) precursor as claimed in claim 16.

19. A method of applying a coating of a conjugated polymer material, comprising ink-jet printing a precursor of the conjugated polymer material that has a viscosity less than 5 cps.

20. A method for producing a conjugated polymer precursor having a reduced viscosity substantially as herein described with reference to the accompanying drawings.

* * * * *